(12) United States Patent
Gaertner et al.

(10) Patent No.: US 6,328,003 B1
(45) Date of Patent: Dec. 11, 2001

(54) INTERNAL COMBUSTION ENGINE WITH A SEPARATELY OPERABLE ADDITIONAL VALVE IN THE CYLINDER HEAD AND METHOD OF OPERATING SAME

(75) Inventors: Uwe Gaertner, Remshalden; Michael Hoffman, Weinstadt, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/429,928

(22) Filed: Oct. 29, 1999

(30) Foreign Application Priority Data

Oct. 29, 1998 (DE) .............................. 198 49 914

(51) Int. Cl.⁷ .......................... F02M 25/07; F02B 75/02
(52) U.S. Cl. .................... 123/58.8; 123/568.12; 123/568.13; 123/568.2; 60/605.2
(58) Field of Search ..................... 123/58.8, 321, 123/316, 568.11, 568.12, 568.2, 568.13; 60/605.2

(56) References Cited

U.S. PATENT DOCUMENTS

| | | | |
|---|---|---|---|
| 4,131,095 | * 12/1978 | Ouchi | 123/58.8 |
| 4,156,414 | * 5/1979 | Kawamura et al. | 123/568.2 |
| 4,194,472 | * 3/1980 | Amano et al. | 123/58.8 |
| 4,506,633 | * 3/1985 | Britsch | 123/58.8 |
| 4,917,054 | * 4/1990 | Schmitz | 123/58.8 |
| 5,115,790 | * 5/1992 | Kawamura | 123/568.2 |
| 5,203,310 | 4/1993 | Gatellier | 123/568.13 |
| 5,517,976 | * 5/1996 | Bachle et al. | 60/605.2 |
| 5,746,189 | * 5/1998 | Kuzuya et al. | 123/568.2 |

FOREIGN PATENT DOCUMENTS

19621530C1  6/1997  (DE) ..................................

* cited by examiner

Primary Examiner—Willis R. Wolfe
(74) Attorney, Agent, or Firm—Crowell & Moring LLP

(57) ABSTRACT

A multi-cylinder internal combustion engine is provided which includes an exhaust gas driven turbocharger. Each cylinder includes at least one inlet port controllable by an inlet valve, at least one outlet port controlled by an outlet valve, and at least one separate additional auxiliary valve arranged in the cylinder head of the engine. A line for gas flow communicates with the additional auxiliary valves. The line from the auxiliary valve of at least a first cylinder is connected directly or indirectly with at least one second cylinder, and the gas flow through that line from the first cylinder to the second cylinder is controllably guided also to a pressure storage device and/or a turbine of the turbocharger.

58 Claims, 7 Drawing Sheets

INTERNAL COMBUSTION ENGINE WITH A SEPARATELY OPERABLE ADDITIONAL VALVE IN THE CYLINDER HEAD AND METHOD OF OPERATING SAME

BACKGROUND AND SUMMARY OF THE INVENTION

This application claims the priority of German application 198 49 914.0, filed in Germany on Oct. 29, 1998, the disclosure of which is expressly incorporated by reference herein.

The invention relates to an internal combustion engine with a separately operable additional valve, in addition to intake and exhaust valves at respective cylinders.

To improve combustion in internal combustion engines and the exhaust emission specification, it is known to recirculate a portion of the exhaust gas.

An internal combustion engine is known from U.S. Pat. No. 5,203,310 that has a separately operable exhaust gas recirculating valve in addition to the intake valves and exhaust valves for the charge changing process, said exhaust gas recirculating valve being located in the cylinder head of the engine. An exhaust gas recirculating line can be controlled by the exhaust gas recirculating valve and runs between an intake port and exhaust port of a cylinder or, alternatively, between the interior of the cylinder and the intake port. The exhaust gas recirculating valve can be opened at the beginning of the intake cycle of the corresponding cylinder. The beginning and duration of the exhaust gas recirculation can be adjusted depending on the desired quantity of exhaust gas to be recirculated and the operating state of the internal combustion engine.

One disadvantage of the internal combustion engine or of the method described consists in the fact that it cannot be used or can be used to only a very limited extent in supercharged engines. In order to achieve exhaust gas recirculation using the method described, the pressure in the intake port must be lower than the exhaust gas pressure in the exhaust port, in other words there must be a negative pressure differential across the internal combustion engine. In supercharged engines, however, especially supercharged diesel engines, except at low partial loads, the boost pressure in the intake port is higher than the exhaust gas pressure in the exhaust port. Exhaust recirculation is not possible.

In addition, an engine with an additional exhaust gas recirculating valve in the cylinder head is known from DE 196 21 530 C1, through which valve the interior of the cylinder can be connected with the exhaust port of the cylinder. In the method described, an exhaust stroke of adjacent expelling cylinders is used in the method described by suitable timing of the exhaust recycling valve. Despite a pressure drop that is positive on average over time between the intake port and the exhaust port, during the exhaust stroke of the adjacent expelling cylinder the pressure in the exhaust line is higher than the boost pressure for a short time, so that exhaust gas flows into the combustion chamber through the open exhaust recirculating valve. The disadvantage of the method is that the recirculated volume of exhaust gas depends on the load and rpm of the engine. The quantity recirculated therefore cannot be adjusted at will at any operating point.

Additional concepts for exhaust gas recirculation in supercharged engines provide for a corresponding throttling of the boost air or the use of ejectors in operating ranges in which the boost pressure is greater than the exhaust gas pressure in order to produce the desired pressure differentials for exhaust gas recirculation. However, these measures are mostly expensive and cumbersome and also cause considerable construction cost and space requirements.

A goal of the invention is to design an internal combustion engine with an additional valve in an economical fashion so that improved exhaust gas emission specifications can be reached, especially in supercharged internal combustion engines.

This goal is achieved according to preferred embodiments of the invention by providing an internal combustion engine comprising a first cylinder, a first intake valve operable to control an intake port of the first cylinder, a first exhaust valve operable o control an exhaust port of the first cylinder, a first additional valve operable to control gas flow from the first cylinder separately from the first intake valve and the first exhaust valve, a second cylinder, a second intake valve operable to control an intake port of the second cylinder, a second exhaust valve operable to control an exhaust port of the second cylinder, a second additional valve operable to control gas flow from the second cylinder separately from the second intake valve and the second exhaust valve, a gas flow line communicating with the first additional valve, and a gas flow control arrangement operable to control gas flow in the gas flow line from the first cylinder to the second cylinder.

The invention takes its departure from the fact that in an engine that can be adjusted especially flexibly, the engine can advantageously be kept close to optimum over a wide operating range, so that the efficiency is increased and the exhaust emission specifications can be improved.

According to the invention, at least a first cylinder is connected by an additional valve through a line directly or indirectly with at least one second cylinder. As a result, gas can be conducted from the first cylinder into the second cylinder and can be varied in terms of composition, pressure, and temperature. Furthermore, over a long time interval, gas can be removed at a high pressure and supplied to one or more cylinders deliberately in a specific cycle, for example in the intake cycle or power stroke. A sufficiently high pressure potential or a corresponding pressure drop can be achieved over the entire operating range, especially in supercharged engines.

Advantageously, exhaust gas can be removed at high pressure for exhaust gas recirculation over a long period of time, with the additional valve opening each time following the end of combustion during the power stroke or the exhaust stroke and closing before the cylinder pressure drops below the pressure on the intake side. The additional valve can thus be opened for almost two power strokes. A sufficiently high exhaust gas pressure, especially for supercharged engines as well, can be achieved over the entire operating range of the engine. The rate of exhaust gas recirculation can be adjusted over the entire characteristic map of the engine.

In the engine according to the invention, the recirculated exhaust gas can also be cooled. A high charge density with a sufficiently large amount of fresh air can be achieved, with fuel consumption being reduced and the exhaust emission specification being improved, especially particle emission.

In order to produce an economical engine overall, the additional valve can be especially favorably used for other functions in addition to exhaust gas recirculation, especially for braking operation of the engine and for producing compressed air. The available parts are used for several functions, saving on parts, construction, and expense.

Additional advantages follow from the description of the drawing below. The drawings show embodiments of the invention. The specification and the claims contain numerous features in combination. The individual skilled in the art will advantageously also consider the features individually and combine them to come up with logical further combinations.

Other objects, advantages and novel features of the present invention will become apparent from the following detailed description of the invention when considered in conjunction with the accompanying drawings.

DETAILED DESCRIPTION OF THE DRAWINGS

Figure 1:
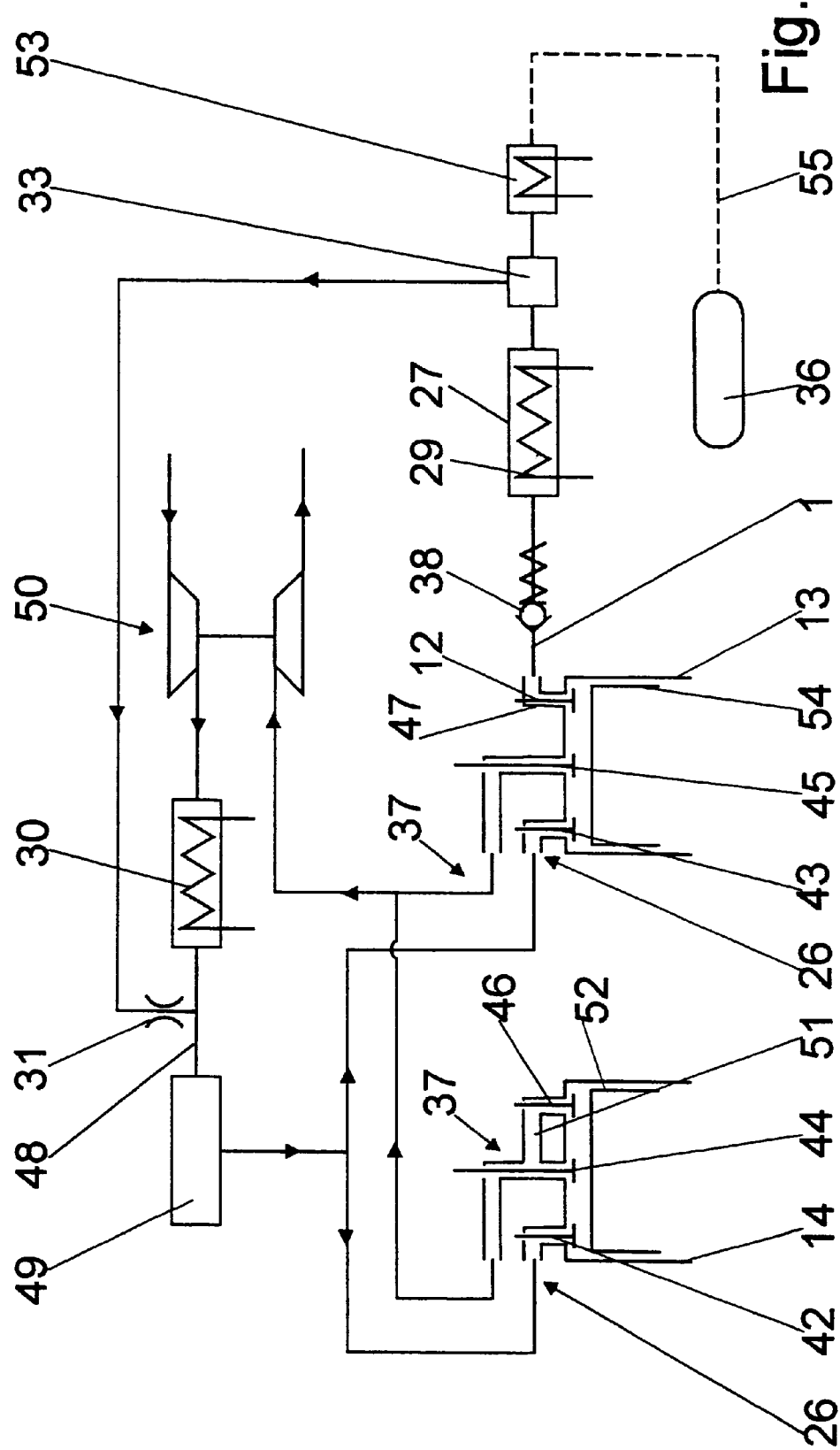
FIG. 1 is a schematic diagram of a portion of an internal combustion engine with an additional valve, constructed according to a preferred embodiment of the present invention.

FIG. 1 shows a supercharged internal combustion engine according to the invention with two cylinders 13, 14. Cylinders 13, 14 each have an additional valve 12, 46 in the cylinder head besides intake valves 42, 43 and exhaust valves 44, 45. The additional valve can be opened and closed independently of intake valves 42, 43 and exhaust valves 44, 45. By means of additional valve 12 of cylinder 13, a channel 47 in the cylinder head can be closed that is connected with a line 1. Line 1 leads through a check valve 38, a storage tank 27, and simultaneous coolers 29, a switching valve 33, a throttle 31, and a line 48 to a charge air tube 49 and thus to the intake side 26 of cylinders 14 and 13.

Figure 3:
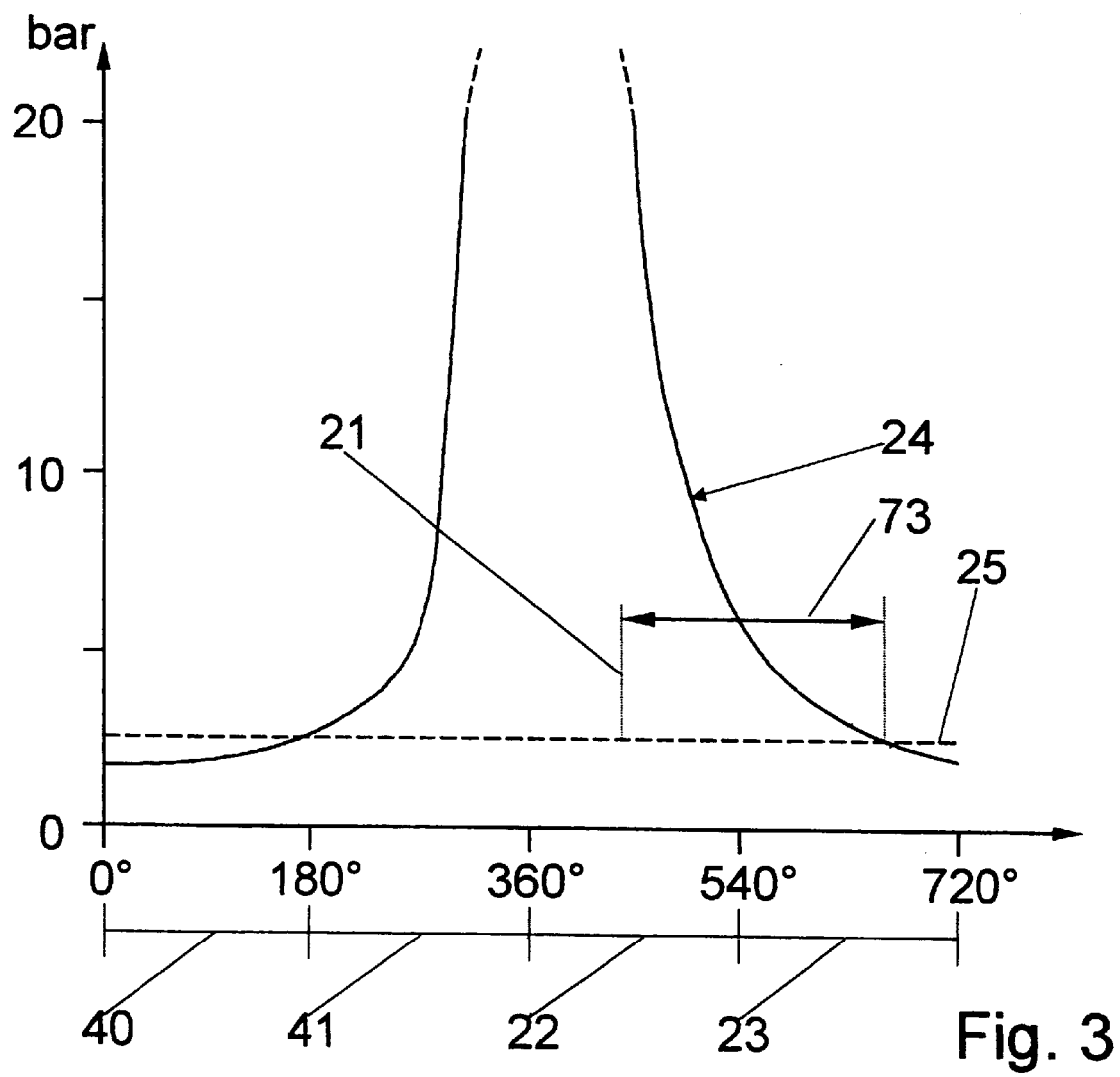
FIG. 3 is a pressure curve graph for a cylinder of an engine operated in accordance with preferred embodiments of the invention.

If the engine is operated with exhaust gas recirculation, additional valve 12 opens during power stroke 22 or during exhaust cycle 23. In FIG. 3, pressure 24 in cylinder 13 is plotted over a crank angle for an intake cycle 40, a compression cycle 41, a power stroke 22, and an exhaust stroke 23 of cylinder 13. The opening time of additional valve 12 is marked 73. Advantageously, the additional valve 12 is opened after the end 21 of combustion, and is closed later when the cylinder pressure 24 in exhaust cycle 23 falls below a boost pressure 25 prevailing on intake side 26. As long as cylinder pressure 24 is higher than the pressure in storage tank 27, exhaust gas flows out of cylinder 13 into the storage tank 27 and cools off there, then flows on to boost air pipe 49 and mixes there with the fresh air coming from exhaust gas turbocharger 50 and cooled by a boost air cooler 30. On the intake stroke of cylinder 14 that is next in the firing order, cylinder 14 receives a mixture of exhaust gas and fresh air. Exhaust gas recirculation results in a lower $NO_x$ emission. As a result of the throttle 31 located downstream of storage tank 27, in the case when only one cylinder 13 is used for exhaust gas recirculation, assurance is provided that even the last cylinder in the firing order is supplied adequately with exhaust gas. In addition, an equal distribution of the exhaust gas over the cylinders 13, 14 is achieved. Through switching valve 33, storage tank 27 can be closed in the boost air tube 49 direction and undesired emptying of storage tank 27 is avoided during deceleration.

In engine braking operation, additional valve 46 is connected through a channel 51 with exhaust side 37 of cylinder 14. As a result, a piston 52 in cylinder 14 can be braked against the exhaust gas counterpressure by opening the additional valve 46 during braking operation of the internal combustion engine. Cylinder 13, on the other hand, is connected through switching valve 33, a compressed air line 55, and an additional cooler 53 with a pressure tank 36 or with a compressed air line of the engine. If the engine is operated in braking operation, by opening additional valve 12 a piston 54 in cylinder 13 can be braked advantageously against the pressure in pressure tank 36. Check valve 38 prevents compressed air from flowing back into cylinder 13 through additional valve 12.

Basically, in all operating modes, compressed air can be supplied through additional valve 12 if necessary. According to certain preferred operating modes of the invention, during driving operation, no fuel is injected into the air-supply cylinder 13. In cylinder 14 and in the remaining cylinders, not shown in greater detail, the performance is raised accordingly in order to avoid overall power loss. When the remaining cylinders reach full load, a decision is made according to a priority between the need for compressed air and the need for higher driving power. Downstream from cooler 53, depending on the requirements of the engine, additional components of a compressed air system can be incorporated, for example an oil separator, air dryer, etc.

Cooler 29 reduces the amount of heat in the exhaust gas in exhaust gas recirculating operation only down to a temperature level at which separation of water of condensation does not quite occur. Cooler 53 reduces the compressed air further to a temperature advantageous for pressure tank 36 and especially for downstream consumers. Cooler 53 for example itself can be formed by the compressed air line 55 to pressure tank 36. It is also possible to avoid using cooler 53 if cooler 29 has sufficiently large dimensions. Accumulating condensate however must be removed. Available parts can be used to generate compressed air, such as cylinder 13, cooler 29, and switching valve 33, saving additional parts and thus reducing costs and construction expense.

Additional valve 12 is advantageously hydraulically operated through an actuating piston not shown in greater detail or can be freely cycled by the latter, for example by a solenoid valve. In cylinder 13, in engine braking operation, depending on the position of piston 54, pressure fluctuations of 0–50 bars occur, causing additional valve 12 to flutter in the open position. To avoid this, it is proposed to locate a hydraulic pressure increase in front of the actuating piston of additional valve 12, for example a stepped piston. As a result, a sufficient pressure can be achieved with an oil pump that is attractively priced and has small dimensions, said pressure being approximately 20 to 22 bars.

In the drawing figures, the same reference numbers have been used to indicate similar structures or features.

Accordingly, descriptions of these features have not been repeated for each drawing figure and reference should be made to descriptions in connection with similarly numbered structures or features for other drawing figures.

Figure 2:
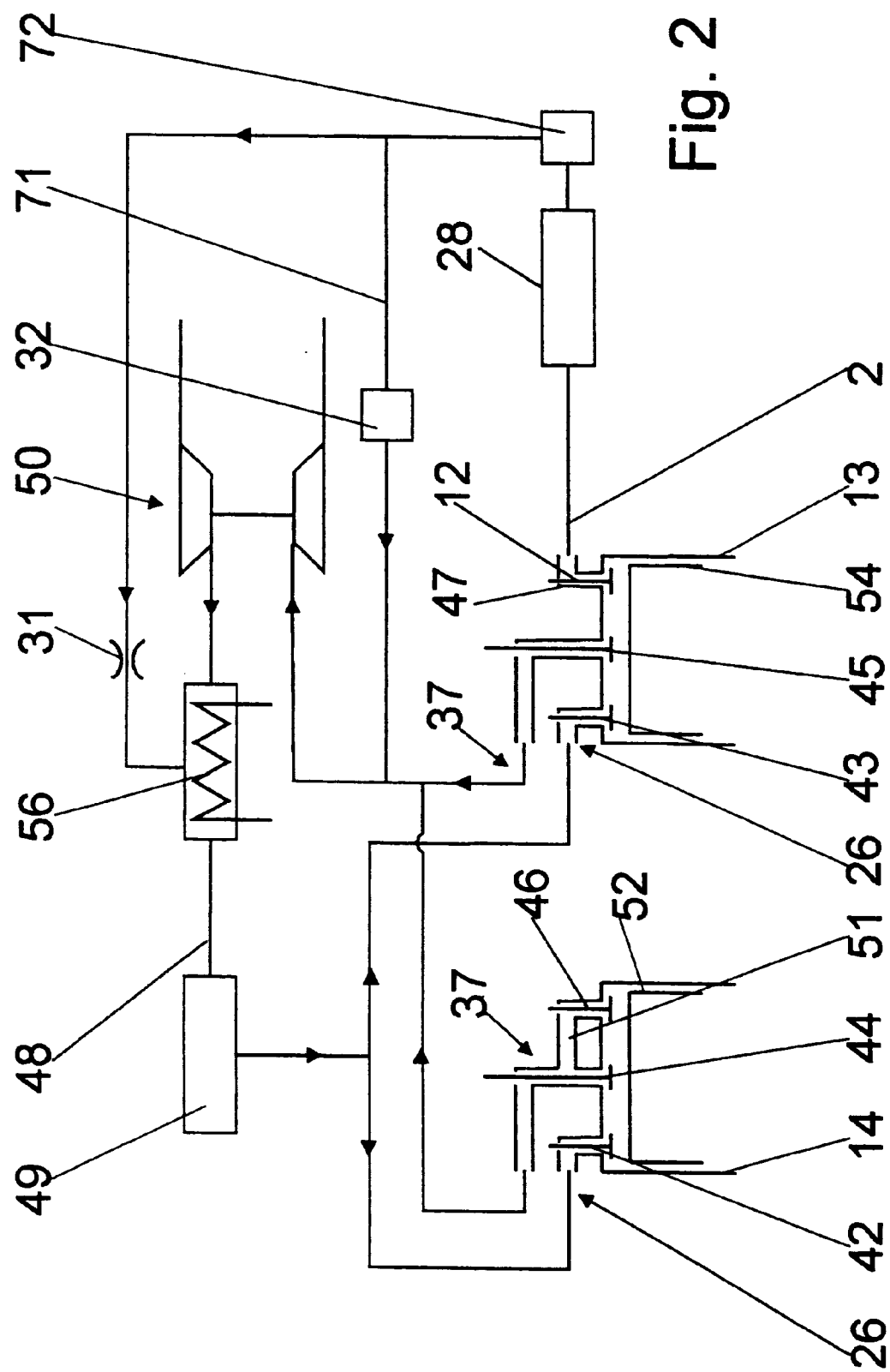
FIG. 2 is a view similar to FIG. 1, showing a modified preferred embodiment of the present invention.

In the embodiment shown in FIG. 2, a line 2 from additional valve 12 terminates in a boost air cooler 56. Boost air cooler 56 is designed so that it is not sensitive to the contamination and wear processes produced by the recirculated exhaust gas. An additional cooler in a storage tank 28 located downstream of additional valve 12 can be omitted. In order to avoid the storage tank 28 being emptied when decelerating, line 2 is closable by a shutoff valve 72 in the direction of the boost air pipe 49.

In addition, line 2, by contrast with the embodiment in FIG. 1, is connected with exhaust side 37 by a line 71 and a switching valve 32. It is also possible for the switching valve 32 to be made integral with switching valve 72. When the engine is operated in braking operation, switching valve 32 connects line 2 through line 71 with the exhaust side 37 and piston 54 is braked against the exhaust gas pressure. The embodiment in FIG. 2 can also be combined with a compressed air generator corresponding to the embodiment in FIG. 1.

If the exhaust gas pressure is higher than the pressure on the intake side, for example in engines that are not supercharged, in engines with certain supercharging devices or only temporarily in certain operating states, in the embodiment in FIG. 2, in addition to the exhaust gas recirculation described, there is another provision for recirculating exhaust gas. The exhaust gas is tapped off from the exhaust gas turbocharger 50 on the exhaust side 37 and during the intake cycle 40 of cylinder 14, it is guided through additional valve 12 directly into the combustion chamber. Contamination of the parts on intake side 26 is avoided, for example by boost air pipe 49. In addition, the exhaust gas can be supplied deliberately at a certain point in time to cylinder 14, independently of the opening characteristic of intake valve 42. If the engine has a plurality of cylinders corresponding to cylinder 14, in order to produce a combustion air ratio of the cylinders that is as uniform as possible, the exhaust gas is fed separately to each cylinder. In addition, an advantageous charge stratification of the exhaust gas and the fresh air can be produced. In order to cool the exhaust gas, a cooler can be provided in line 71 or line 2, for example in one piece with storage tank 28.

Figure 4:
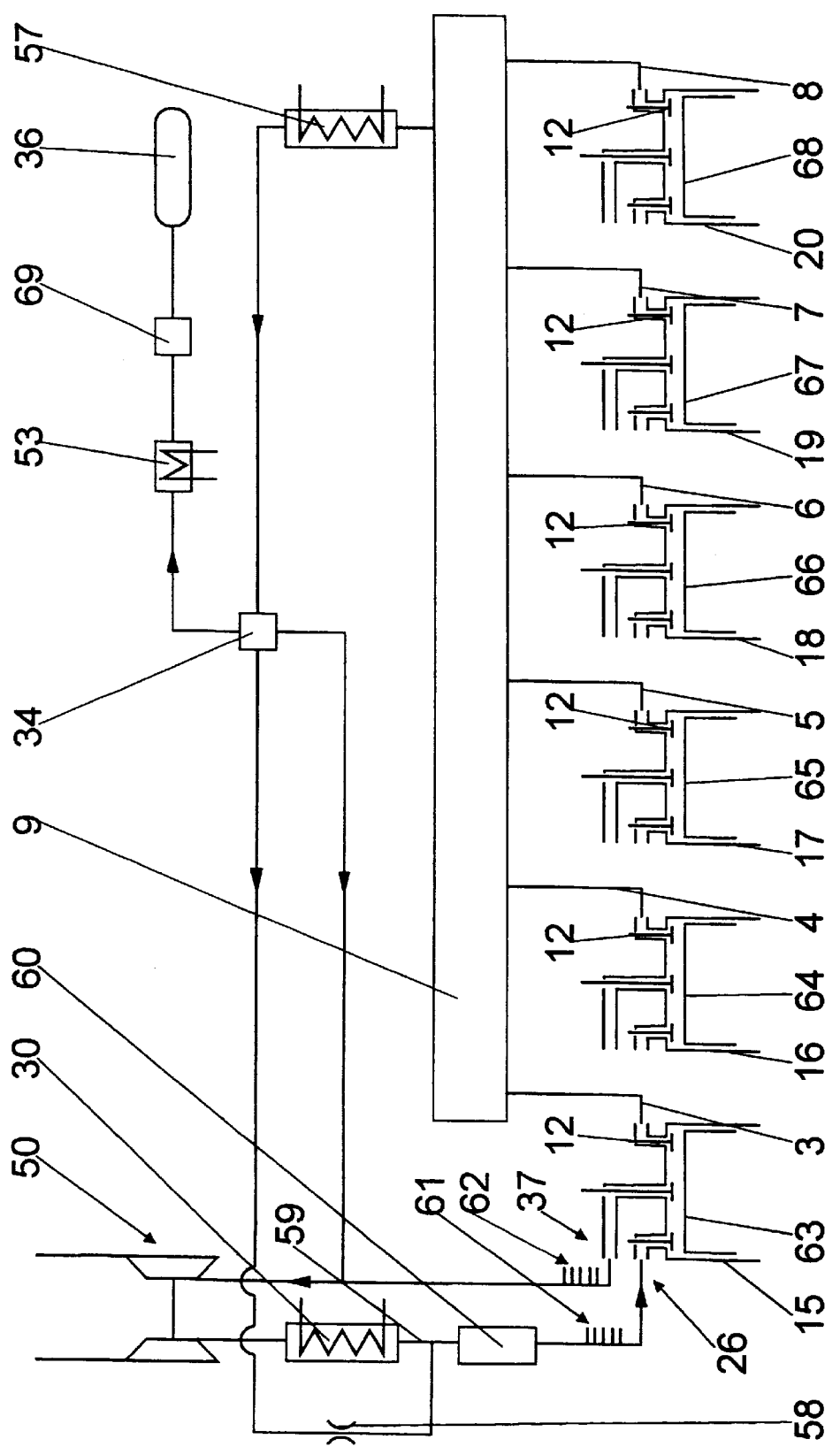
FIG. 4 is a schematic diagram of an internal combustion engine having six cylinders and a line connecting the additional valves with one another, constructed according to a preferred embodiment of the present invention.

FIG. 4 shows an engine with six cylinders 15, 16, 17, 18, 19, and 20, each of which has an additional valve 12 according to the invention. Lines 3, 4, 5, 6, 7, and 8 coming from additional valves 12 are connected by a common line 9 which serves as a gas reservoir and can be located in the cylinder head itself or outside it. With exhaust gas recirculating operation of the engine, the additional valves 12 each preferably open at the end of the power stroke of cylinders 15, 16, 17, 18, 19, and 20. The exhaust gas flows through the common line 9, through a cooler 57, a switching valve 34, a throttle 58, and a line 59 to a boost air pipe 60 and then to the intake side 26 of cylinders 15, 16, 17, 18, 19, and 20. The lines 61 on the intake side 26 to cylinders 16, 17, 18, 19, and 20 and the lines 62 on exhaust side 37 of cylinders 16, 17, 18, 19, and 20 are shown only partially. If only a low exhaust gas recirculation rate is required, advantageously only individual cylinders 15, 16, 17, 18, 19, and 20 can be utilized for exhaust gas recirculation.

During braking operation of the internal combustion engine, the common line 9 is connected through switching valve 34 with exhaust side 37. Pistons 63, 64, 65, 66, 67, and 68 of cylinders 15, 16, 17, 18, 19, and 20 can be braked against the exhaust gas pressure by opening additional valves 12. Cooling is not necessary. Cooler 57 can be cut out during braking operation.

To generate compressed air, the common line 9 is connected through switching valve 34 with pressure tank 36. A cooler 53 and an oil separator 69 are located between switching valve 34 and pressure tank 36.

Figure 5:
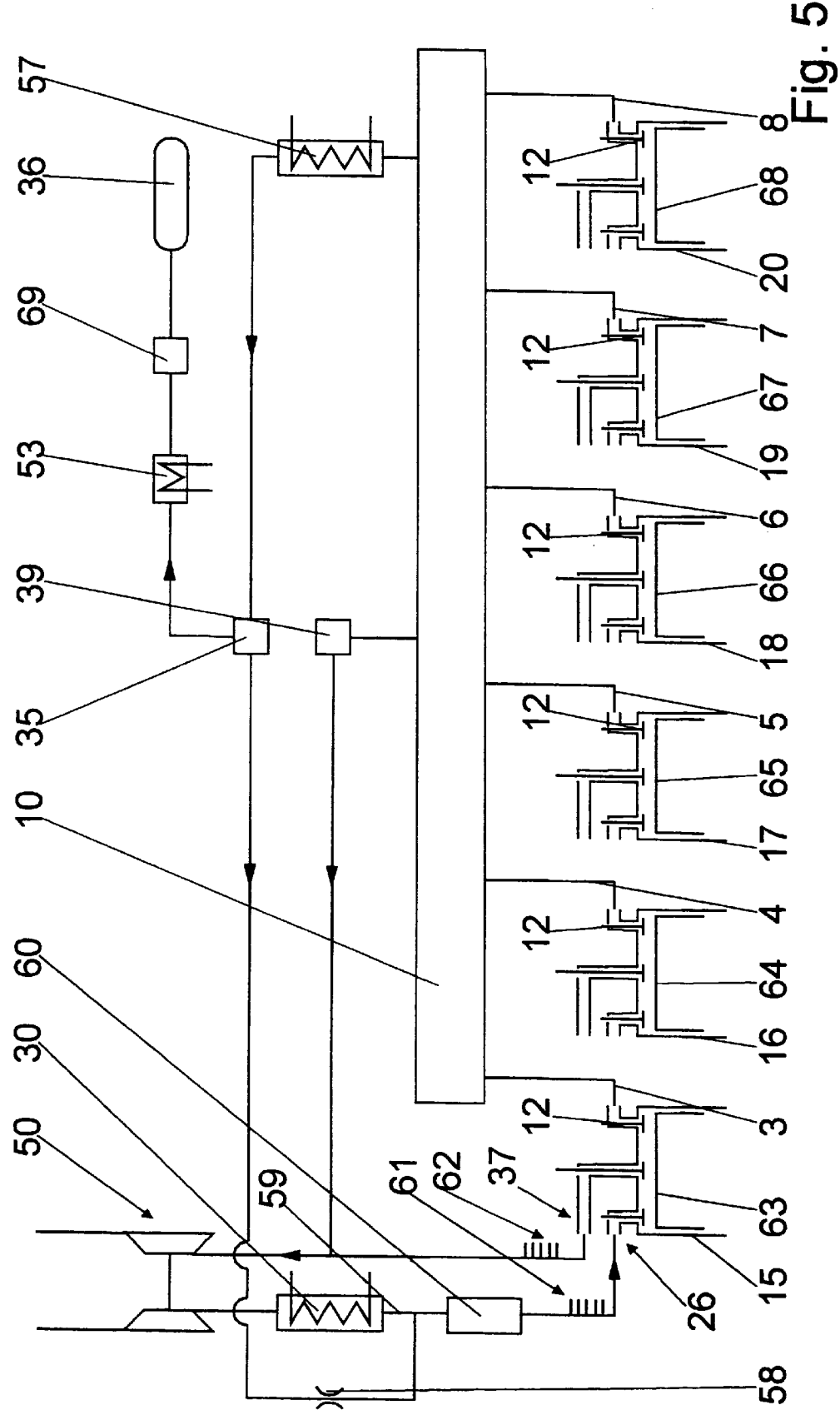
FIG. 5 is a view similar to FIG. 4, showing a modified preferred embodiment of the present invention.

In FIG. 5, a common line 10 linking additional valves 12 is connected by a first switching valve 39 with the exhaust side 37 and by a second switching valve 35 with pressure tank 36 and intake side 26. During braking operation, pressure losses through cooler 57 are avoided and the exhaust gas is supplied, uncooled, to the exhaust gas turbocharger 50 at a high energy, so that a higher boost pressure can be reached than in the embodiment in FIG. 4. The air compressor operation and the exhaust gas recirculation operation proceed as in FIG. 4, with switching valve 39 being closed.

Figure 6:
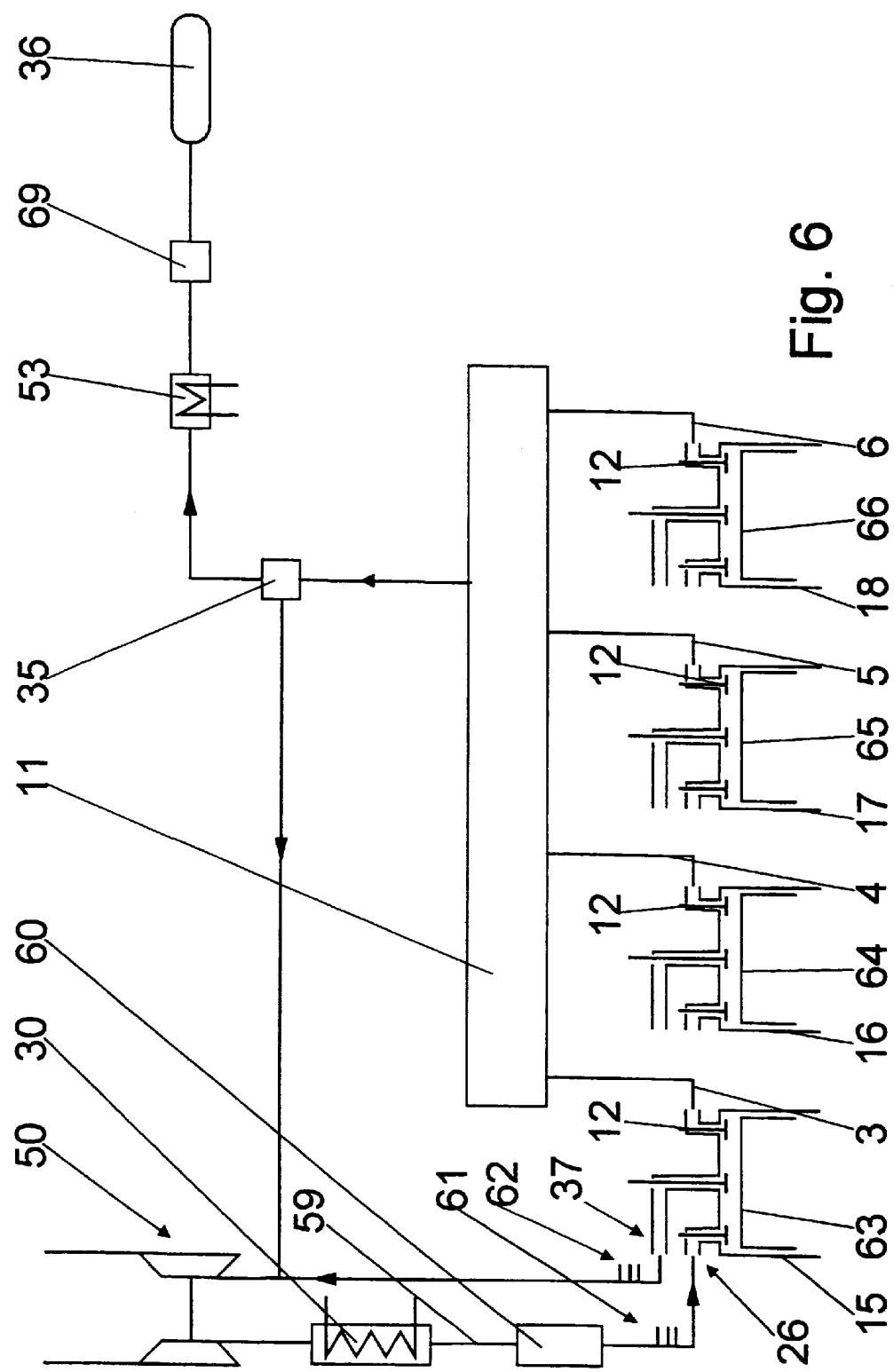
FIG. 6 is a schematic diagram of an internal combustion engine having four cylinders and a line connecting the additional valves with one another, constructed according to a preferred embodiment of the present invention.

In FIG. 6, the lines 3, 4, 5, and 6 coming from additional valves 12 are connected by a common line 11. Braking operation and air compressor operation take place as in the embodiment in FIG. 5 through a switching valve 35.

Figure 7:
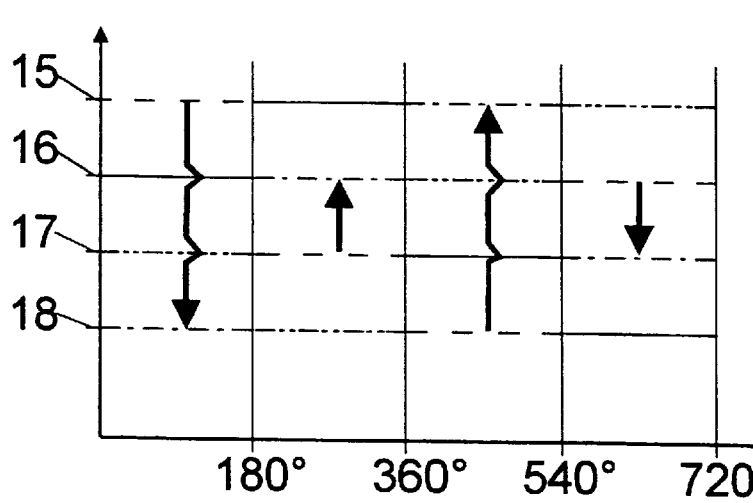
FIG. 7 is an overview of the operating cycles of the cylinders of the engine according to FIG. 6 showing the flow directions between the cylinders.
Figure 7:
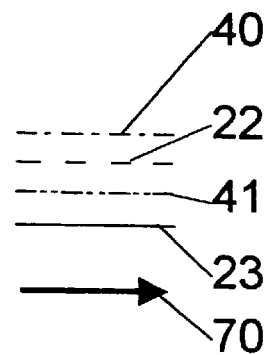
Figure 8:
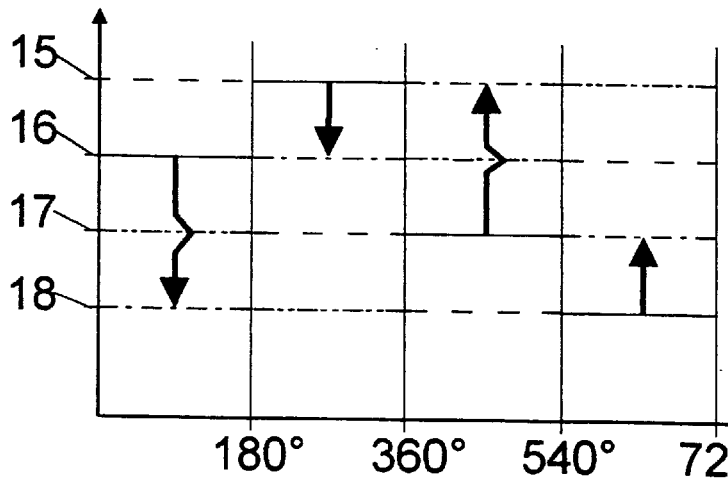
FIG. 8 is a variation on FIG. 7.

The exhaust gas recirculation operation of cylinders 15, 16, 17, and 18 is shown in FIG. 7 and FIG. 8 whose cycles 40, 22, 41, 23 are plotted against a crank angle. The firing order is 15, 17, 18, 16. When cylinder 15 is in power stroke 22, intake cycle 40 is taking place in cylinder 18 at the same time. When the two additional valves 12 of cylinders 15 and 18 open, as a result of the pressure differential, exhaust gas from cylinder 15, which is in power stroke 22, flows through additional valves 12 and through line 11 into cylinder 18 which is in intake stroke 40, according to the flow direction marked 70. The opening time depends on the need for exhaust gas to be recirculated and hence on the current load and rpm state of the engine. In the remainder of the curve, cylinders 15, 16, 17, and 18 are connected correspondingly with one another. In order to achieve a higher charge density, common line 11 is cooled.

In FIG. 8, instead of the additional valve 12 of cylinder 15 in power stroke 22, the additional valve 12 of cylinder 16 is opened in exhaust cycle 23. Exhaust gas flows from cylinder 16 in exhaust cycle 23 through additional valves 12 and through common line 11 into cylinder 18, which at the same time is in intake stroke 40. The additional valves 12 close at the latest when the pressure in expelling cylinder 16 drops below the pressure on intake side 26. In the remainder of the curve, cylinders 15, 16, 17, and 18 are connected accordingly with one another.

Figure 9:
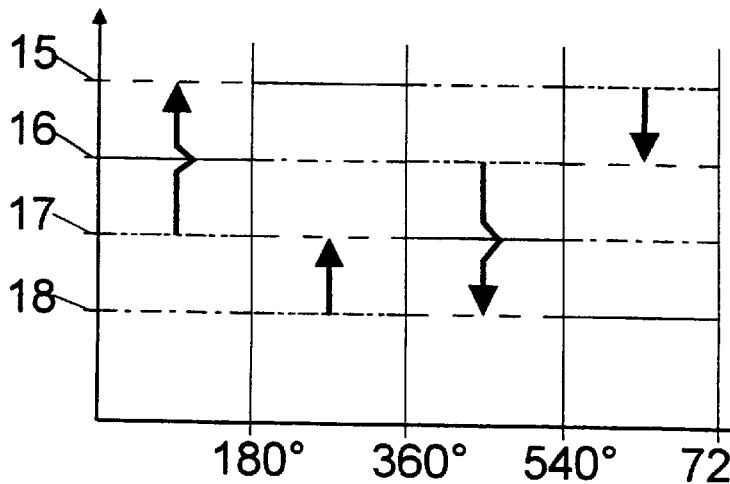
FIG. 9 is another variation on FIG. 7.

FIG. 9 shows another application of the embodiment in FIG. 6. Additional valve 12 of cylinder 17 is open, the fresh air is compressed in compression cycle 41, and additional valve 12 of cylinder 15 is in power stroke 22. The compressed fresh air flows from cylinder 17 through additional valves 12 and the common connecting line 11 into cylinder 15. Additional valves only open when the pressure in cylinder 17 exceeds the pressure in cylinder 15. In the remainder of the curve, cylinders 15, 16, 17, and 18 are connected correspondingly with one another. By blowing fresh air into cylinders 15, 16, 17, and 18, which are in power stroke 22, the exhaust emission specifications are improved, with particle emissions being reduced in particular.

In order to utilize certain pressure ratios between cylinders 15, 16, 17, and 18, it may be advisable to open and close additional valves 12 on a time-staggered basis. The methods shown in FIGS. 7 to 8 can also be combined with one another.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An internal combustion engine comprising:
    a first cylinder,
    a first intake valve operable to control an intake port of the first cylinder,
    a first exhaust valve operable to control an exhaust port of the first cylinder,
    a first additional valve operable to control gas flow from the first cylinder separately from the first intake valve and the first exhaust valve,
    a second cylinder,
    a second intake valve operable to control an intake port of the second cylinder,
    a second exhaust valve operable to control an exhaust port of the second cylinder,
    a second additional valve operable to control gas flow from the second cylinder separately from the second intake valve and the second exhaust valve,
    a gas flow line communicating with the first additional valve, and
    a gas flow control arrangement operable to control gas flow in the gas flow line from the first cylinder to the second cylinder,
    further comprising a compressed air system,
    wherein said gas flow control arrangement is operable to selectively connect the gas flow line with a storage tank of the compressed air system.

2. An internal combustion engine comprising:
    a first cylinder,
    a first intake valve operable to control an intake port of the first cylinder,
    a first exhaust valve operable to control an exhaust port of the first cylinder,
    a first additional valve operable to control gas flow from the first cylinder separately from the first intake valve and the first exhaust valve,
    a second cylinder,
    a second intake valve operable to control an intake port of the second cylinder,
    a second exhaust valve operable to control an exhaust port of the second cylinder,
    a second additional valve operable to control gas flow from the second cylinder separately from the second intake valve and the second exhaust valve,
    a gas flow line communicating with the first additional valve, and
    a gas flow control arrangement operable to control gas flow in the gas flow line from the first cylinder to the second cylinder,
    wherein said engine is a diesel engine with an exhaust gas driven turbocharger, and
    wherein said gas flow control arrangement is operable to communicate gas from the first cylinder to the second cylinder during operation of said first cylinder with gas pressure of the first additional valve which is above an outlet gas pressure of the turbocharger.

3. A method of operating an internal combustion engine comprising:
    a first cylinder,
    a first intake valve operable to control an intake port of the first cylinder,
    a first exhaust valve operable to control an exhaust port of the first cylinder,
    a first additional valve operable to control gas flow from the first cylinder separately from the first intake valve and the first exhaust valve,
    a second cylinder,
    a second intake valve operable to control an intake port of the second cylinder,
    a second exhaust valve operable to control an exhaust port of the second cylinder,
    a second additional valve operable to control gas flow from the second cylinder separately from the second intake valve and the second exhaust valve,
    a gas flow line communicating with the first additional valve, and
    a gas flow control arrangement operable to control gas flow in the gas flow line from the first cylinder to the second cylinder,
    said method comprising operating the gas flow control arrangement to communicate gas from the first cylinder to the second cylinder as a function of engine operating conditions, including the operating cycle of the first cylinder,
    wherein said engine is a diesel engine with an exhaust gas driven turbocharger, and
    wherein said operating the gas glow arrangement includes communicating gas from the first cylinder to the gas flow line and the second cylinder during operation of said first cylinder with gas pressure at the first additional valve which is above an outlet gas pressure of the turbocharger.

4. Multicylinder internal combustion engine which has a plurality of cylinders, a first cylinder having at least one intake port and one intake valve, an exhaust port and an exhaust valve, and at least one separately operable additional valve located in a cylinder head of the engine and by which a gas flow in a line is controllable,
    wherein the line is connected with at least one second cylinder directly or indirectly and with the additional valve, a gas flow from the first cylinder being controllable to selectively flow into at least one of the second cylinder, a compressed air system, and a turbine of an exhaust gas driven turbocharger, and
    wherein the line from the one additional valve of the first cylinder is connected through a switching valve with a pressure tank or with the exhaust side of at least one second cylinder.

5. Internal combustion engine according to claim 4, wherein a check valve is located between the additional valve and the switching valve.

6. A method of operating an internal combustion engine comprising:
    a first cylinder,
    a first intake valve operable to control an intake port of the first cylinder,
    a first exhaust valve operable to control an exhaust port of the first cylinder,
    a first additional valve operable to control gas flow from the first cylinder separately from the first intake valve and the first exhaust valve, a second cylinder, a second intake valve operable to control an intake port of the second cylinder, a second exhaust valve operable to control an exhaust port of the second cylinder, a second additional valve operable to control gas flow from the second cylinder separately from the second intake valve and the second exhaust valve, a gas flow line communicating with the first additional valve, and a gas flow control arrangement operable to control gas flow in the gas flow line from the first cylinder to the second cylinder, said method comprising operating the gas flow control arrangement to communicate gas from the first cylinder to the second cylinder as a function of engine operating conditions, including the operating cycle of the first cylinder, wherein said engine includes an exhaust gas driven turbocharger, and wherein said operating the gas flow control arrangement includes communicating the gas flow through the gas flow line in bypassing relation to the turbocharger.

7. A method according to claim 6, wherein said operating the gas flow control arrangement includes opening the first additional valve during portions of a power stroke and an exhaust stroke of the first cylinder.

8. A method according to claim 6, wherein said operating the gas flow control arrangement includes opening the first additional valve during portions of a power stroke and an exhaust stroke of the first cylinder.

9. Multicylinder internal combustion engine which has a plurality of cylinders, a first cylinder having at least one intake port and one intake valve, an exhaust port and an exhaust valve, and at least one separately operable additional valve located in a cylinder head of the engine and by which a gas flow in a line is controllable, wherein the line is connected with at least one second cylinder directly or indirectly and with the additional valve, a gas flow from the first cylinder being controllable to selectively flow into at least one of the second cylinder, a compressed air system, and a turbine of an exhaust gas driven turbocharger, and wherein a cooler is located in the line.

10. Internal combustion engine according to claim 9, wherein a storage tank is located in the line and is made integral with the cooler.

11. Internal combustion engine according to claim 10, wherein a shutoff valve is located downstream from the storage tank.

12. Internal combustion engine according to claim 10, wherein a throttle is located in the line downstream from the storage tank.

13. Internal combustion engine according to claim 12, wherein a shutoff valve is located downstream from the storage tank.

14. Multicylinder internal combustion engine which has a plurality of cylinders, a first cylinder having at least one intake port and one intake valve, an exhaust port and an exhaust valve, and at least one separately operable additional valve located in a cylinder head of the engine and by which a gas flow in a line is controllable, wherein the line is connected with at least one second cylinder directly or indirectly and with the additional valve, a gas flow from the first cylinder being controllable to selectively flow into at least one of the second cylinder, a compressed air system, and a turbine of an exhaust gas driven turbocharger, wherein the line is connected with an intake side of the second cylinder, and wherein the additional valve of the first cylinder in exhaust gas recirculation operation each time following an end of combustion opens during a power stroke or exhaust stroke and closes before cylinder pressure in the exhaust stroke falls below the pressure on the intake side of the second cylinder.

15. Internal combustion engine according to claim 14, wherein a cooler is located in the line.

16. Internal combustion engine according to claim 15, wherein the cooler is a boost air cooler.

17. Internal combustion engine according to claim 14, wherein a storage tank is located in the line.

18. Internal combustion engine according to claim 17, wherein a throttle is located in the line downstream from the storage tank.

19. Internal combustion engine according to claim 17, wherein a shutoff valve is located downstream from the storage tank.

20. An internal combustion engine comprising:

a first cylinder, a first intake valve operable to control an intake port of the first cylinder, a first exhaust valve operable to control an exhaust port of the first cylinder, a first additional valve operable to control gas flow from the first cylinder separately from the first intake valve and the first exhaust valve, a second cylinder, a second intake valve operable to control an intake port of the second cylinder, a second exhaust valve operable to control an exhaust port of the second cylinder, a second additional valve operable to control gas flow from the second cylinder separately from the second intake valve and the second exhaust valve, a gas flow line communicating with the first additional valve, and a gas flow control arrangement operable to control gas flow in the gas flow line from the first cylinder to the second cylinder, further comprising an exhaust gas driven turbocharger, wherein said gas flow control arrangement controls the gas flow from the first cylinder to the second cylinder in bypassing relation to the turbocharger.

21. An internal combustion engine according to claim 20, comprising a compressed air system, wherein said gas flow control arrangement is operable to selectively connect the gas flow line with a storage tank of the compressed air system.

22. An internal combustion engine according to claim 20, wherein said engine includes a further plurality of cylinders with respective intake, exhaust and additional valves, and wherein said gas flow line is a common line communicating with the first additional valve and with the additional valves of the further plurality of cylinders.

23. An internal combustion engine according to claim 20, further comprising a compressed air system, wherein said gas flow control arrangement is operable to selectively connect the gas flow line with a storage tank of the compressed air system.

24. An internal combustion engine according to claim 20, wherein said gas flow control arrangement is operable to open the first additional valve during portions of a power stroke and an exhaust stroke of the first cylinder.

25. An internal combustion engine according to claim 24, wherein said engine is a diesel engine with an exhaust gas driven turbocharger, and wherein said gas flow control arrangement is operable to communicate gas from the first cylinder to the second cylinder during operation of said first cylinder with gas pressure of the first additional valve which is above an outlet gas pressure of the turbocharger.

26. A method of operating an internal combustion engine comprising:

a first cylinder a first intake valve operable to control an intake port of the first cylinder, a first exhaust valve operable to control an exhaust port of the first cylinder, a first additional valve operable to control gas flow from the first cylinder separately from the first intake valve and the first exhaust valve, a second cylinder, a second intake valve operable to control an intake port of the second cylinder, a second exhaust valve operable to control an exhaust port of the second cylinder, a second additional valve operable to control gas flow from the second cylinder separately from the second intake valve and the second exhaust valve, a gas flow line communicating with the first additional valve, and a gas flow control arrangement operable to control gas flow in the gas flow line from the first cylinder to the second cylinder, said method comprising operating the gas flow control arrangement to communicate gas from the first cylinder to the second cylinder as a function of engine operating conditions, including the operating cycle of the first cylinder, wherein a compressed air system is provided in conjunction with the engine, and wherein said operating the gas flow control arrangement includes selectively communicating the gas flow in the gas flow line with a storage tank of the compressed air system.

27. A method according to claim 26, wherein said engine is a diesel engine with an exhaust gas driven turbocharger, and wherein said operating the gas flow arrangement includes communicating gas from the first cylinder to the gas flow line and the second cylinder during operation of said first cylinder with gas pressure at the first additional valve which is above an outlet gas pressure of the turbocharger.

28. A method according to claim 26, wherein said engine includes a further plurality of cylinders with respective intake, exhaust and additional valves, and wherein said gas flow line is a common line communicating with the first additional valve and with the additional valves of the further plurality of cylinders.

29. A method according to claim 26, wherein said engine includes an exhaust gas driven turbocharger, and wherein said operating the gas flow control arrangement includes communicating the gas flow through the gas flow line in bypassing relation to the turbocharger.

30. A method according to claim 29, wherein said engine includes a further plurality of cylinders with respective intake, exhaust and additional valves, and wherein said gas flow line is a common line communicating with the first additional valve and with the additional valves of the further plurality of cylinders.

31. A method according to claim 30, wherein a compressed air system is provided in conjunction with the engine, and wherein said operating the gas flow control arrangement includes selectively communicating the gas flow in the gas flow line with a storage tank of the compressed air system.

32. A method of operating an internal combustion engine which has a plurality of cylinders, a first cylinder having at least one intake port and one intake valve, an exhaust port and an exhaust valve, and at least one separately operable additional valve located in a cylinder head of the engine and by which a gas flow in a line is controllable, wherein the line is connected with at least one second cylinder directly or indirectly and with the additional valve, a gas flow from the first cylinder into the at least one second cylinder being controllable to selectively flow into one of a compressed air system and a turbine of an exhaust gas driven turbocharger, said method comprising controlling the additional valve to communicate gas from the first cylinder to the line as a function of operating cycles of the first cylinder.

33. A method according to claim 32, wherein said controlling the additional valve includes opening the additional valve at the first cylinder during portions of a power stroke and an exhaust stroke at the first cylinder.

34. A method according to claim 32, wherein said engine includes a further plurality of cylinders with respective intake, exhaust and additional valves, and wherein said gas flow line is a common line communicating with the first additional valve and with the additional valves of the further plurality of cylinders.

35. A method according to claim 34, wherein said controlling includes opening respective additional valves of those cylinders which are in a power stroke and opening those of the additional valves of the cylinders which are in an intake stroke and communicating exhaust gas to flow from the cylinders in the power stroke through the additional valves and through the common line into the other cylinders during their intake stroke.

36. A method according to claim 34, wherein said controlling includes opening respective additional valves of the cylinders which are in an exhaust cycle and opening respective additional valves of the cylinders which are in intake stroke and communicating exhaust gas from the respective cylinders to flow away from the cylinders in the exhaust stroke through the additional valves and through the common line into other respective cylinders in the intake stroke.

37. A method according to claim 34, wherein said controlling includes opening the additional valve of respective cylinders which are in a compression cycle and opening respective additional valves of cylinders which are in a power stroke when the compression pressure exceeds the working pressure such that fresh air flows from the cylinders in the compression stroke through the additional valves and through the common line into the cylinders in the power stroke.

38. A method according to claim 34, wherein at higher pressures on an exhaust side, exhaust gases recirculating from the exhaust side through the common line and through a respective additional valve and at least one cylinder.

39. A method according to claim 34, wherein said first cylinder is operated without fuel injection to thereby operate to move compressed air via the additional valve to respective other cylinders to thereby increase delivery of air and power for the remaining cylinders.

40. Multicylinder internal combustion engine which has a plurality of cylinders, a first cylinder having at least one intake port and one intake valve, an exhaust port and an exhaust valve, and at least one separately operable additional valve located in a cylinder head of the engine and by which a gas flow in a line is controllable, wherein the line is connected with at least one second cylinder directly or indirectly and with the additional valve, a gas flow from the first cylinder into the at least one second cylinder being controllable to selectively flow into one of a compressed air system and a turbine of an exhaust gas driven turbocharger.

41. Internal combustion engine according to claim 40, wherein the additional valve can be hydraulically cycled freely by an actuating piston and a hydraulic pressure increase located upstream of the actuating piston.

42. Internal combustion engine according to claim 40, wherein the line from the one additional valve of the first cylinder is connected through a switching valve with a pressure tank or with the exhaust side of at least one second cylinder.

43. Internal combustion engine according to claim 42, wherein a check valve is located between the additional valve and the switching valve.

44. Internal combustion engine according to claim 40, wherein each of the cylinders have said intake, exhaust and additional valves, and wherein the additional valves are connected by a common line.

45. Internal combustion engine according to claim 44, wherein the common line is cooled.

46. Internal combustion engine according to claim 44, wherein the common line can be connected by a switching valve with a pressure tank and/or with the exhaust side of the cylinders.

47. Internal combustion engine according to claim 46, wherein the common line can be connected through a first switching valve with the exhaust side and through a second switching valve with the pressure tank and the intake side.

48. Internal combustion engine according to claim 40, wherein the line is connected with an intake side of the second cylinder, and wherein the additional valve of the first cylinder in exhaust gas recirculation operation each time following an end of combustion opens during a power stroke or exhaust stroke and closes before cylinder pressure in the exhaust stroke falls below the pressure on the intake side of the second cylinder.

49. Internal combustion engine according to claim 48, wherein a cooler is located in the line.

50. Internal combustion engine according to claim 49, wherein the cooler is a boost air cooler.

51. Internal combustion engine according to claim 48, wherein a storage tank is located in the line.

52. Internal combustion engine according to claim 51, wherein a throttle is located in the line downstream from the storage tank.

53. Internal combustion engine according to claim 51, wherein a shutoff valve is located downstream from the storage tank.

54. Internal combustion engine according to claim 40, wherein a cooler is located in the line.

55. Internal combustion engine according to claim 54, wherein a storage tank is located in the line and is made integral with the cooler.

56. Internal combustion engine according to claim 55, wherein a shutoff valve is located downstream from the storage tank.

57. Internal combustion engine according to claim 55, wherein a throttle is located in the line downstream from the storage tank.

58. Internal combustion engine according to claim 52, wherein a shutoff valve is located downstream from the storage tank.

* * * * *